Nov. 30, 1965     J. W. HUFFMAN     3,221,123
THERMORESPONSIVE CONTROL FOR ELECTRICALLY
ENERGIZABLE HEATING UNIT
Filed Feb. 26, 1962     4 Sheets-Sheet 1
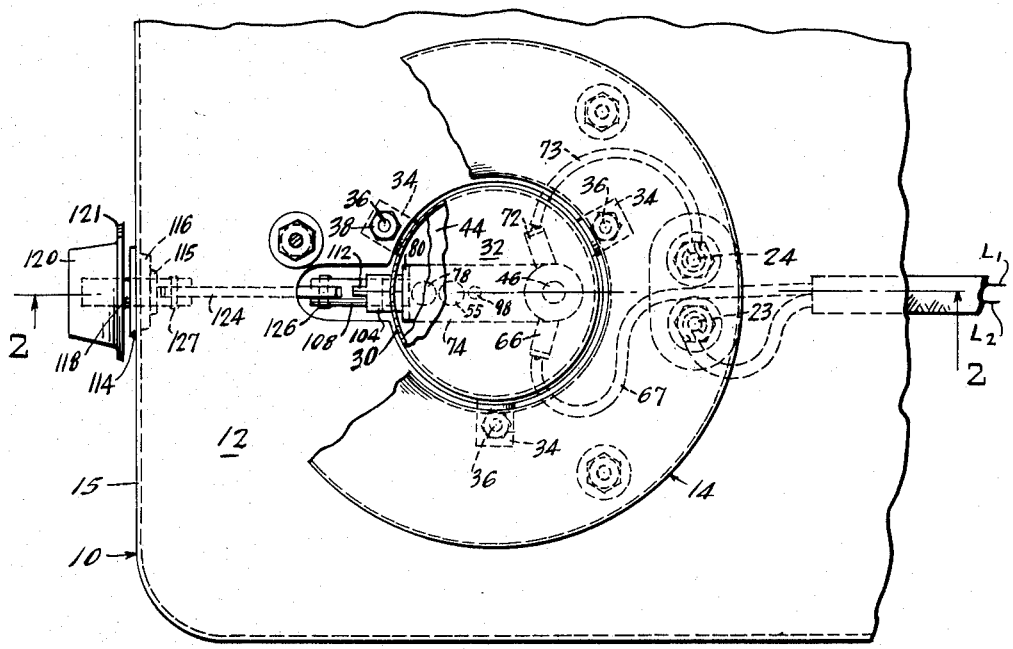
FIG-1-
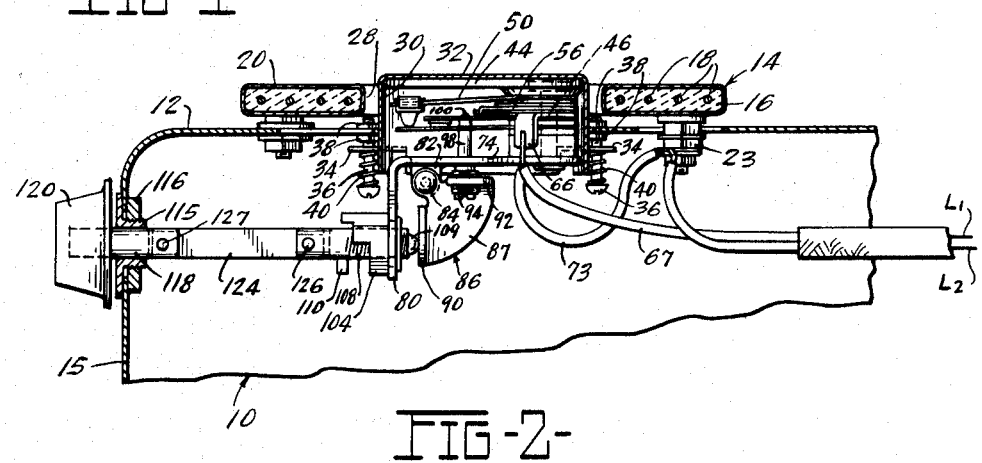
FIG-2-
INVENTOR:
JOHN W. HUFFMAN.
BY
Harry O. Ernsberger
ATTORNEY

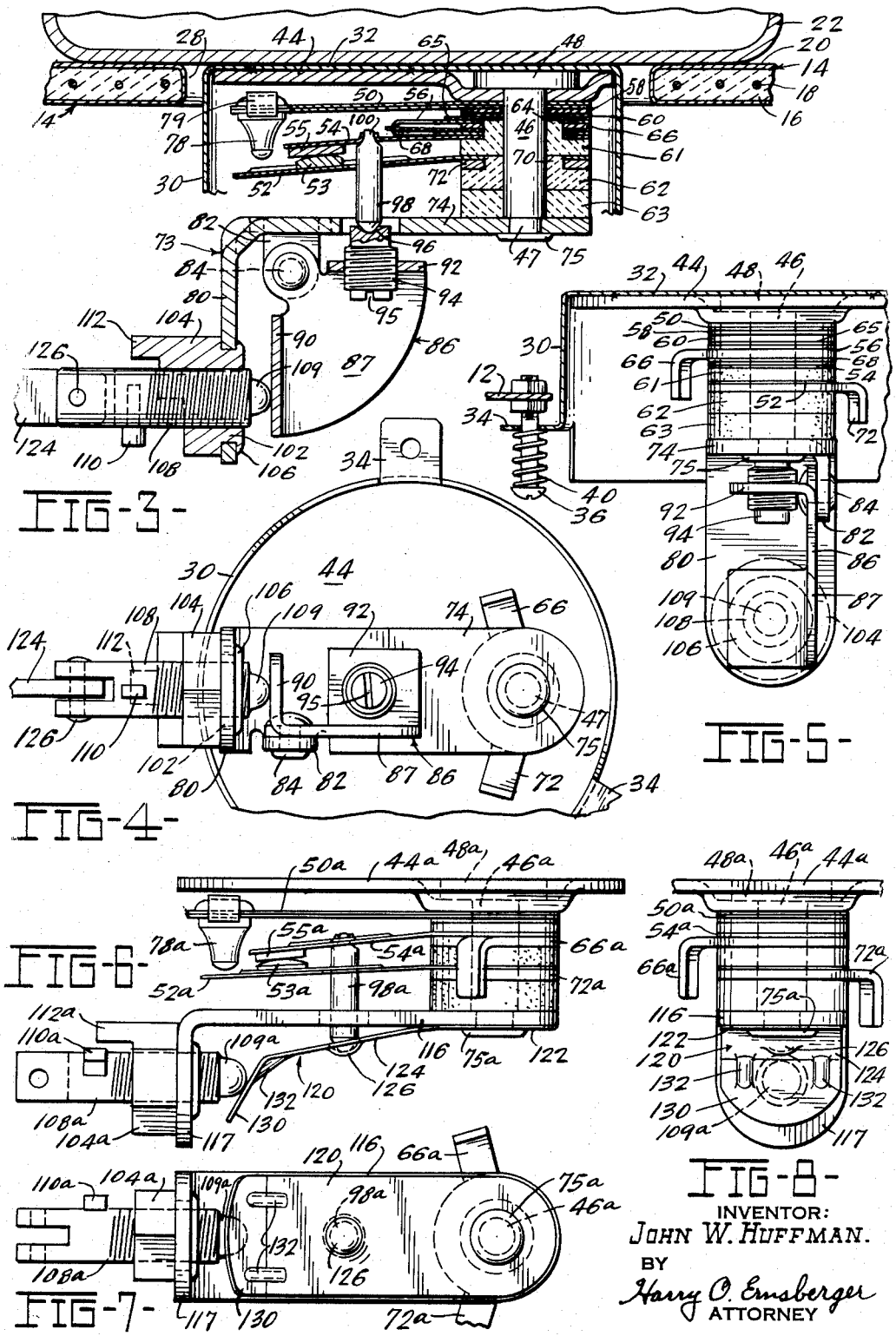

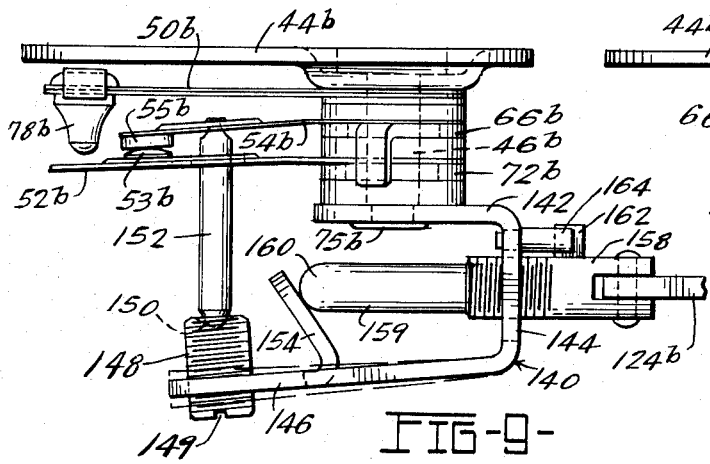

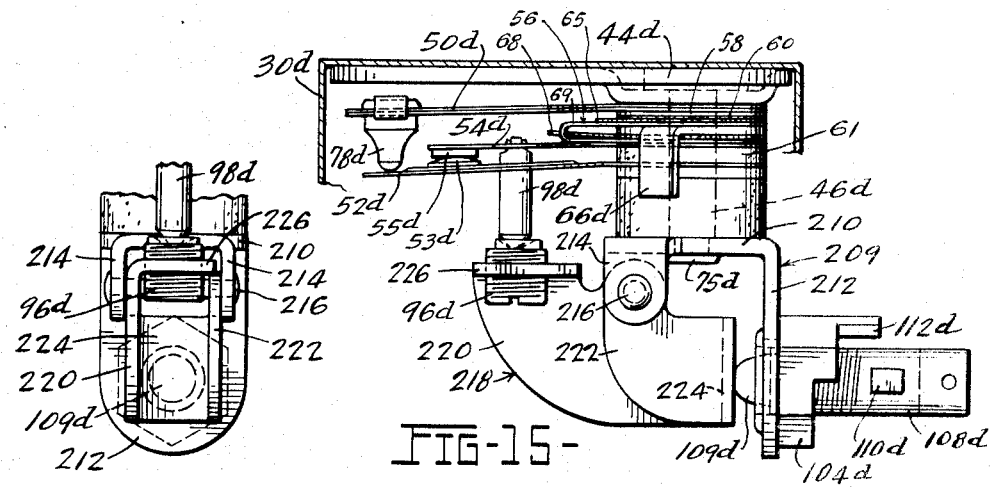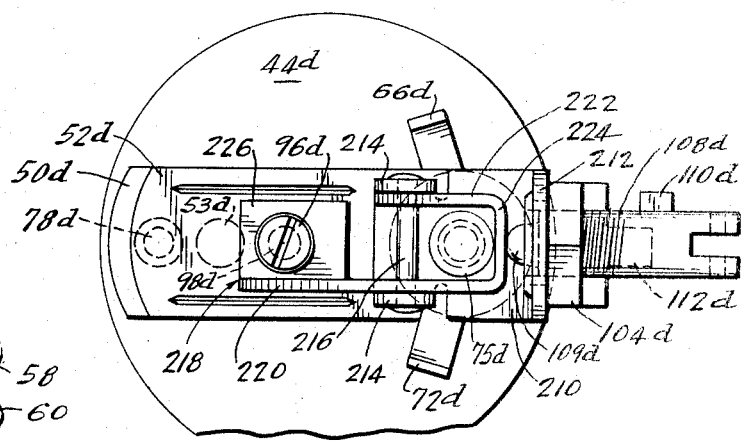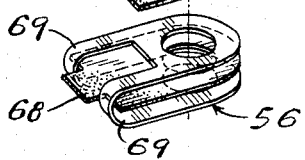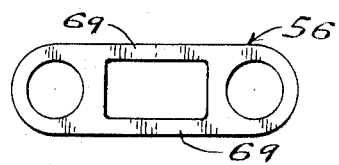

United States Patent Office 3,221,123
Patented Nov. 30, 1965

3,221,123
THERMORESPONSIVE CONTROL FOR ELECTRICALLY ENERGIZABLE HEATING UNIT
John W. Huffman, Mansfield, Ohio, assignor to Pace, Inc., Mansfield, Ohio, a corporation of Ohio
Filed Feb. 26, 1962, Ser. No. 175,450
2 Claims. (Cl. 200—122)

This invention relates to thermoresponsive control apparatus for electrically energizable heating units and more especially to a thermoresponsive control for electrically energizable surface units of a cooking range especially adapted for controlling the heat applied to a cooking receptacle disposed in heat conducting or heat transferring relation with the heating unit.

The invention embraces the provision of a thermoresponsive circuit controlling means or switch means for a so-called electrically energizable "top burner" or surface heater of a cooking range, the control means being of compact construction to occupy a small space centrally of the heating element or surface heater and which is adjustable for varying the temperature range within which it is desired to maintain the cooking receptacle and its contents.

The invention includes the provision of a thermoresponsive switch for an electrically energizable range heater, the switch embodying a resistance heating element or unit for accelerating the action of the thermoresponsive means to attain more sensitive control.

The invention has for an object the provision of a thermoresponsive control switch for an electrically energizable heating unit wherein a thermoresponsive means is in an effective heat transferring relation with a cooking receptacle, the control apparatus embodying a compact means for adjusting the temperature range within which it is desired to maintain the cooking receptacle and its contents.

Another object of the invention is the provision of a thermoresponsive control apparatus for a surface heating unit wherein the switch arms and the thermoresponsive means are in substantial parallelism with the plane of the surface heating unit the construction embodying a temperature range regulating means adjustable about an axis in substantial parallelism with the plane of the surface heating unit whereby the thermoresponsive apparatus extends a minimum distance beneath the surface heating unit.

Another object of the invention resides in an improved control means for a thermoresponsive control apparatus for a surface heating unit of a cooking range or the like embodying a "stacked switch" construction disposed for effective transfer of heat from a base of a cooking receptacle to the thermoresponsive element of the switch construction.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a top plan view of a portion of a cooking range illustrating a form of control apparatus of the invention associated with a surface heating unit of the range;

FIGURE 2 is a sectional view taken substantially on the line 2—2 of FIGURE 1;

FIGURE 3 is an enlarged vertical sectional view of a portion of the construction illustrated in FIGURE 2 showing a cooking receptacle in position on the heating unit;

FIGURE 4 is a bottom plan view of the thermoresponsive control apparatus shown in FIGURE 3;

FIGURE 5 is an end view of the construction shown in FIGURE 3;

FIGURE 6 is a view similar to FIGURE 3 illustrating a modified form of control apparatus of the invention;

FIGURE 7 is a bottom plan view of the construction shown in FIGURE 6;

FIGURE 8 is an end view of the construction shown in FIGURE 6;

FIGURE 9 is an enlarged side elevational view illustrating a modified form of thermoresponsive control apparatus of the invention;

FIGURE 10 is a bottom plan view of the construction shown in FIGURE 9;

FIGURE 11 is an end view of the construction shown in FIGURE 9;

FIGURE 12 is an enlarged elevational view illustrating another form of thermoresponsive control apparatus of the invention;

FIGURE 13 is a bottom plan view of the construction shown in FIGURE 12;

FIGURE 14 is an end elevational view of the construction shown in FIGURE 12;

FIGURE 15 is an enlarged vertical sectional view of a modified form of the invention illustrated in FIGURE 3;

FIGURE 16 is a bottom plan view of the construction illustrated in FIGURE 15;

FIGURE 17 is an end view of a construction shown in FIGURE 16;

FIGURE 18 is an isometric view of components of a resistance heater for the thermoresponsive control apparatus, and FIGURE 19 is a plan view of the resistance element of the heater.

While the invention has particular utility for controlling the flow of electric current to a surface heater or unit of a cooking range wherein heat is transferred from a cooking receptacle to a thermoresponsive means of the switch construction to control the temperature of the cooking receptacle, the control arrangement may be used with other heating apparatus where it is desired to regulate and control the temperature of a receptacle and its contents.

Referring to the drawings in detail and initially to the arrangement illustrated in FIGURES 1 through 5, FIGURES 1 and 2 illustrate a portion of a cooking range 10 preferably formed of sheet metal having a planar top surface 12 which may be coated with porcelain or other suitable heat resistant material. Associated with the range 10 is a surface heating unit or so-called "top burner" 14 with which the invention has particular utility.

The heater unit 14, in the embodiment illustrated, comprises an annularly shaped member 16 which supports a heating element 18 which may be of the resistance types, the member 16 having a planar upper surface 20 upon which a cooking receptacle 22 is adapted to be positioned as shown in FIGURE 3. The resistance unit 18 may be a spirally shaped conductor, the ends of which are respectively connected with terminal posts 23 and 24. The planar upper surface 20 of the heating unit 14 is adapted to support a cooking receptacle or the like 22 and to receive heat from the heating unit.

Disposed in the central circular space 28 defined by the annularly shaped heating unit 14 is a metal housing or shell 30 preferably of circular shape having a planar portion 32 adapted to be engaged by the bottom of the cooking receptacle 22. The casing 30 encloses the thermoresponsive switch means as shown in FIGURE 2. The depending circular wall of the casing 30 is formed with circumferentially-spaced outwardly extending projections or ledges 34, there being three in the embodiment illustrated in FIGURES 1 and 2, each projection 34 being provided with an opening accommodating a bolt 36.

Each bolt extends through an opening in the range housing 12 and is secured to the housing by means of pairs of nuts 38. A coil spring 40 surrounds each bolt and is disposed between the adjacent projection 34 and the head of the bolt as particularly shown in FIGURE 2. Through this arrangement the casing 30 is resiliently supported. The pairs of nuts 38 are adjusted so that the planar surface or plate 32 of the casing is normally slightly above the plane of the surface 20 of the heating unit.

When a cooking receptacle 22 is placed on the heating unit, the weight of the receptacle forces the casing 30 downwardly against the tension of the springs 40 so as to establish an intimate heat transferring contact between the casing 30 and the bottom surface of the cooking receptacle 22. In this position of the cooking receptacle, the plane of the surface 32 of the casing 30 and that of the upper surface 18 of the heating unit are in a common plane.

The switch means of the thermoresponsive control arrangement is particularly illustrated in detail in FIGURES 3 through 5. The switch means is inclusive of a support or mounting plate 44 which is welded or otherwise secured to the planar portion 32 of the casing 30. The plate or member 44 is provided with an opening accommodating a cylindrical member or shaft 46 which forms a component of the support means for the switch components, the member 46 having a head portion 48 which is in contact or heat transferring relation with the planar portion 32 of the casing 30. The switch construction is inclusive of a thermoresponsive means or bimetallic element 50, a first switch arm or member 52, a second switch arm or member 54, and a supplemental heater element 56 for accelerating the action of the thermoresponsive means 50. These components are supported by means associated with the plate 44 and the cylindrical member 46. The thermoresponsive means or bimetallic element 50 is fashioned with an opening adjacent one end region facilitating its assembly on the member 46 whereby the member 50 is fixedly supported at one end. The accelerator heater element 56 is illustrated in FIGURE 19 and in assembly is formed to the configuration shown in FIGURE 18.

Fitted over the cylindrical member 46 is a metal washer 58 engageable with the member 50. A washer 60 of mica or other suitable high temperature insulating material is fitted over the cylindrical member 46 and engages the metal washer 58. Also fitted onto the cylindrical support member 46 are insulating discs 61, 62 and 63 of ceramic or other insulating material which is resistant to high temperature. The disc 61 is fashioned with a tenon portion 64 on which is fitted a mica leaf 65, the resistance heater 56, a terminal connector 66, a mica strip 68 between the laps of the heater 56 and switch arm 54 are provided with openings whereby these components are received on the tenon portion 64 of the disc 61.

The resistance unit 56 is fashioned with bridge portions 69 of limited cross-section providing resistance to establish heat under current flow. Current flows to switch arm 52 from the terminal or connector 66 through the bridge sections or portions 69 when the contacts 53 and 55 are engaged and the limited areas of the bridge sections generate heat for accelerating the action of the bimetallic element 50.

The ceramic insulating disc 62 is provided with a tenon portion 70 on which is fitted the switch arm 52 and a second connector 72. The ceramic discs 61 and 62 insulate the switch arm 52 from the switch arm 54. The switch is inclusive of a member or bracket 73 having a horizontal or body portion 74, the member 46 being provided with a tenon 47 which is received in an opening in the horizontal portion 74 of bracket 73. The components of the switch mechanism above described, including the ceramic disc 63, are assembled upon the cylindrical member 46 and, after assembly with the bracket or member 74, the end of the tenon portion 47 is swaged as at 75 to secure the components in assembled relation.

The distal end of the bimetallic member 50 is provided with a ceramic or lava strut 78 held in place by a clip 79, the strut being adapted to engage the first switch arm 52 upon an increase in ambient temperature which influences the bimetallic element to interrupt the circuit through the heating element 18. The first switch arm 52 is provided with a contact 53 and the second switch arm 54 is provided with a contact 55 for making and breaking the circuit through the heating means or element 18.

The terminal connector 66 is connected by means of a conductor 67 with a line connection L1, and the terminal connector 72 is connected with a terminal 24 by means of a conductor 73. When the contacts 53 and 55 are in engagement, a circuit is completed from the current supply lines L1 and L2 to energize the heating element 18, the circuit to the heating element being interrupted when the bimetallic element 50, under an increase in temperature, causes the strut 78 to engage the first switch arm 52 and disengage the contacts 53 and 55.

Means is provided for manually adjusting the relative position of the second switch arm 54 to regulate the temperature at which the cooking receptacle and its comestible contents are to be maintained. In the arrangement of the invention, a motion translating means is provided whereby adjustment of the second switch arm 54 is effected by means manually movable in a direction generally parallel with the plane of the switch arm 54 whereby the switch mechanism and operating means therefor occupies a minimum depth in the cooking range.

In the arrangement illustrated in FIGURES 2 through 5, the plate or member 74 is fashioned with a depending portion 80 substantially normal to the body of the plate or member 74 as particularly illustrated in FIGURES 2 and 3. Fashioned integrally with the portion 74 of member 73 is a depending ear or lug 82 which is provided with openings to receive a rivet or stub shaft 84. A motion translating means or member 86 is fashioned with a wall portion 87 joined with a portion 90. The portion 87 is provided with an opening to accommodate the rivet or stub shaft 84 whereby the bracket or motion translating member 87 is pivotally supported on the member 73.

Extending laterally from the wall portion 87 of the bracket 86 is a pad portion or flange 92 provided with a threaded opening to receive a threaded member 94, the upper end of which is provided with a conically shaped recess 96. Arranged between the second switch arm 54 and the recess 96 in the member 94 is a ceramic or lava member or strut 98 for transmitting pivotal movement of the member 86 to the switch arm 54. The upper end of the strut 98 is provided with a wedge shaped configuration 100 which projects into a rectangular opening formed in the switch arm 54, the wedge shape 100 preventing rotational movement of the strut 98 with respect to the switch arm 54 and the member 94.

The member 94 is provided with a kerf 95 to accommodate a suitable tool for adjusting the position of the threaded member 94 to establish a proper initial relationship between the switch member 54 and the motion translating means 86.

The portion 80 of the bracket 73 is provided with an opening arranged to receive a tenon 102 formed on a member or bushing 104, the member being securely held to the portion 80 by swaging of a portion of the tenon 102 as indicated at 106.

The bushing 104 is provided with a threaded bore to accommodate a threaded component or member 108 of the switch adjusting means. The member 108 is provided with a transversely extending pin 110 and the bushing 104 is fashioned with a lug or abutment 112 for limiting the rotation of the adjusting means 108 by engagement of the pin 110 with the lug or abutment 112. The extent of rotational movement of member 108 determines the temperature range within which the switch means functions to control the temperature of the cooking receptacle.

The front wall 15 of the cooking range 10 is provided with an opening receiving a threaded tenon portion 115 of a bushing 114, the threaded tenon 115 accommodating a securing nut 116, as shown in FIGURE 2. Rotatably journaled in the bushing 114 is a stub shaft 118 which is equipped with a manipulating knob or member 120 having an index projection 121 for cooperation with a temperature scale (not shown) mounted upon the portion 15 of the cooking range for indicating the temperatures at which the mechanism is adjusted.

The ends of the members 108 and 118 are slotted, as shown in FIGURE 1, to receive and accommodate a link or member 124. The furcations defining the slots in the ends of members 108 and 118 are provided with aligned openings to accommodate pins or stub shafts 126 and 127 for connecting the link or member 124 to the members 108 and 118.

Through this arrangement, any misalignment of the bushing 104 and the bushing 114 is accommodated by the flexible or pivotal connection of the members with the link 124. It is to be understood that, if desired, the member 108 may be extended through the bushing 114 and equipped with the control knob 120.

The inner end of the member 108 is provided with a semi-spherically shaped portion 109 which engages the portion 90 of the motion translating means 86. In the operation of the arrangement illustrated in FIGURES 1 through 5, the operator or user adjusts the position of the switch arm 54 by manipulating the knob 120. The rotation of the knob 120 is transmitted through the link 124 to member 108 causing lengthwise movement of member 108 which effects movement of the motion translating means or member 86, member 94, the strut 98 and the switch member 54.

The strut 98, being of ceramic or lava, insulates the operating mechanism from the switch arm 54. If the cooking receptacle 22 is at a reduced temperature, the contacts 53 and 55 are in engagement to establish an energizing circuit through the heating element. As the cooking receptacle increases in temperature, the temperature in the region of the bimetallic element 50 is increased causing deflection or movement of the bimetallic element in a direction to engage the strut 78 with the first switch arm or member 52.

When the temperature is elevated to that for which the manipulating knob 120 has been set, the strut moves the switch arm 52 downwardly as viewed in FIGURE 3 to separate the contacts 53 and 55 and thereby interrupt the circuit through the heating element 18. As the temperature of the cooking receptacle decreases, the bimetallic element 50 will move upwardly, as viewed in FIGURE 3, away from the switch arm 52 and again permit engagement of the contacts 53 and 55 to energize the heating element 18.

In this manner the temperature of the cooking receptacle 22 and its contents are maintained substantially constant and at the temperature for which the manipulating means 120 has been set. The initial range of temperature embraced within the rotation of the means 108 may be regulated by readjusting the member 94 to change the relative initial position of the member 94 with respect to the switch arm 54.

FIGURES 6 through 8 illustrate a modified form of heating control apparatus of the invention. In this form the support plate 44a, the first switch arm 52a, the second switch arm 54a, the contacts 53a and 55a carried thereby, the bimetallic element 50a and the struts 78a and 98a are of the same construction as hereinbefore described in the form of the invention shown in FIGURES 1 through 5. The assembly of the components upon the support means or member 46a including the terminal members or connectors 66a and 72a is the same as hereinbefore described and shown in detail in FIGURE 3.

The arrangement shown in FIGURES 6 through 8 includes a bracket 116, similar to the bracket 74 having a depending portion 117 supporting the bushing 104a. The bushing 104a is bored and threaded to receive the adjusting means 108a for the switch member 54a, the member 108a being provided with a pin or projection 110a which cooperates with an abutment 112a on the bushing determining the limits of rotation of the member 108a. The member 108a is provided with a semi-spherically shaped extremity 109a.

In this arrangement of the invention, a modified form of motion translating means is provided for transmitting lengthwise movement of the member 108a to the switch arm 54a. The motion translating means 120 is inclusive of a portion 122 which is secured in the switch assembly to the bracket 116 by the swaged region 75a of the member 46a. The motion translating means includes a second portion 124 which is arranged at an acute angle with respect to the plane of the portion 122 of member 116, the portion 124 being fashioned with a depressed portion 126 providing a recess receiving the lower end of the strut 98a as shown in FIGURE 6.

A clearance opening is provided in member 116 to accommodate the strut 98a. The motion translating means 120 is provided with a third portion 130 which is angularly arranged with respect to the portion 124 and is adapted to be engaged by the semi-spherically shaped end region 109a of the adjusting means 108a, in the manner illustrated in FIGURE 6.

The motion translating means or member 120 is of spring metal prestressed in a direction to exert a biasing force on the switch arm 54a in a direction separating the contacts 53a and 55a mounted respectively by the first and second switch arms.

Fashioned integrally with the member 120 at the juncture of the portions 124 and 130 are raised ribs 132 to resist deflection at this region. The spherically shaped end region 109a, in cooperation with the member 120 forms, in effect, cam means for adjusting the relative position of the switch arm 54a. By rotating member 108a in a direction to move the portion 109a lengthwise in a right-hand direction as viewed in FIGURE 6, the member 109a cams the member 120 in a downward direction in opposition to the prestressed biasing force of the member 120, the movement of the member 120 being communicated to the switch arm 54a through the strut 98a to permit movement of the switch arm 54a downwardly.

Rotation of the member 108a in the opposite direction moves the spherically shaped portion 109a in a left-hand direction as viewed in FIGURE 6 permitting the portion 124 of member 120, under its prestressed force, to move upwardly and, through the medium of the strut 98a, moves the switch arm 54a and the contact 55a upwardly and thereby change the position at which engagement of contact 53a is made with contact 55a under the influence of the thermoresponsive means or bimetallic element 50a communicated to the first switch arm 52a through the ceramic strut 78a. This construction provides for a minimum depth of the switch and operating means therefor beneath the surface burner to be controlled.

FIGURES 9, 10 and 11 illustrate a further modified form of apparatus of the invention for controlling the energization of a heating element. In this form, the support plate 44b, member 46b, switch arms 52b and 54b, contacts 53b and 55b, the bimetallic element 50b, ceramic strut 78b, and the terminal connectors 66b and 72b are the same construction as the corresponding components illustrated in FIGURE 3 and hereinbefore described.

A bracket 140 supports the adjusting means for the switch arm 54b and functions as a motion translating means for transmitting motion of an adjusting means to the switch arm 54b. The bracket or component 140 includes a plate portion 142 which is secured in fixed assembly with the switch construction by the swaging 75b on member 46b. The portion 142 is integrally joined with a depending portion 144. The member 140 is provided with a third portion 146 which extends coincident with but at a slight acute angle with respect to the plane of the portion 142 as shown in FIGURE 9.

The distal end region of the portion 146 is provided with a threaded bore accommodating a member 148, the upper end of the member being fashioned with a recess 150 accommodating the lower end of a strut 152 of ceramic or lava, the upper end of which engages the second switch arm 54b. Formed integrally with the portion 146 of the component 140 is an angularly arranged cam portion 154. The portion 154 is fashioned by severing metal of the portion 146 and bending the same to provide the cam portion 154.

This method of forming the cam portion 154 provides spaced parallel legs or connecting portions 156 joining the end region of portion 146 with the depending portion 144. The legs 156, being of reduced cross-sectional area, provide a flexing region whereby the distal end region of the portion 146 may be readily flexed with respect to the depending portion 144 of member 140. The depending portion 144 is provided with a threaded bore accommodating the thread portion of an adjusting means or member 158, the means 158 being fashioned with a tenon 159 having its distal end 160 of semispherical configuration engageable with the cam portion 154.

The adjusting member 158 is provided with a pin or projection 162 adapted for engagement with an abutment or pin 164 carried by the member 140 for limiting rotational movement of the adjusting member 158. The member 158 may be connected by a link 124b with a control knob of the character illustrated at 120 in FIGURES 1 and 2. The portion 146 is normally prestressed in a direction to exert a biasing force through the strut 152 to move the second switch member 54b in a direction to normally separate the contacts 55b and 53b.

In this form of the invention, the user or operator adjusts the means 158 by rotating the same by the control knob to effect lengthwise movement of the member 158 through its threaded connection with the portion 144. The lengthwise movement is transmitted to the cam 154 of the motion translating means 140 and moves the cam to deflect the portion 146 and thereby control the relative position of the second switch arm 54b and the contact 55b carried thereby.

Through this means, the user or operator may adjust the relative position of the contact 55b so that the bimetallic or thermoresponsive element 50b is effective to separate the contacts 53b and 55b by movement of the first switch arm 52b to maintain substantially constant the temperature at which it is desired to maintain a cooking receptacle and its contents by energization and deenergization of the heating element 18 illustrated in FIGURES 1 and 2. The member 148 is provided with a kerf 149 to receive a suitable tool for initially adjusting the relative position of the switch arm 54b with respect to the portion 146 of the motion translating means.

FIGURES 12, 13 and 14 illustrate another form of control apparatus of the invention. In this form, the support plate 44c, the support shaft 46c, the switch arms 52c and 54c, contacts 53c and 55c carried thereby, the terminals 66c and 72c, the thermoresponsive means or bimetallic element 50c and the lava strut 78c carried thereby are of the same construction as the corresponding elements or components illustrated in FIGURE 3 and hereinbefore described. In this form the motion translating means or member 170 is inclusive of a planar portion 172 secured to the support shaft 46c by the swaging 75c.

The portion 172 is integrally joined with a depending portion 174 which is integral with a portion 176 extending substantially parallel with the portion 172 but being adapted to be deflected by cam means.

The distal end region of the portion 176 is provided with a threaded bore accommodating a member 178 which is formed at its upper end with a recess 182 receiving one end of a lava or ceramic strut 184, the other end of the strut being in engagement with the second switch arm 54c.

The member 178 is provided with a kerf 179 to receive a tool for initially adjusting the relative position of the switch arm 54c with respect to the portion 176 of the motion translating means or member 170. The depending portion 174 is provided with an opening to receive a tenon portion of a bushing 186 secured to the depending portion by swaging 187. The bushing 186 is provided with a threaded bore to accommodate the threaded portion of an adjusting means or member 188.

The member 188 is provided with a portion 190 the extremity of which is provided with a squared or polygonally-shaped tenon 191 on which is secured a cam member or means 192, the periphery of the cam being in engagement with the portion 176 of the motion translating means or member 170. In order to facilitate flexing movement of the portion 176, the portion is fashioned with a slot or cutaway region 194 providing leg portions 196 integrally connected with the depending portion 174.

As the leg portions 196 are of reduced cross-sectional area as compared with the cross-sectional area of the distal end region of the member 176, the distal end region of member 176 may be readily flexed by rotation of the cam 192 through rotation of the adjusting member 188.

The metal of the portion 196 is initially tempered, stressed or tensioned to exert a biasing force through member 178 and strut 84 to the switch member 54c to normally maintain the switch member 54c in a position wherein the contact 55c is separated from the contact 53c carried by the switch arm 52c.

By rotation of the adjusting means 188 and the cam 192, the distal region of member 176 is readily flexed to modify the relative position of the second switch arm 54c and the contact 55c. The adjusting means 188 is provided with a pin 198 adapted for cooperation with an abutment 200 formed on the bushing 186 to limit the rotation of the means 188. The limits of rotative movement of the means 188 defines the range of temperature within which the adjusting means is effective to control the temperature of a cooking receptacle and its contents.

The adjusting means or member 188 may be provided with a knurled region 202 adapted to receive and accommodate a control knob of the character illustrated at 120 in FIGURES 1 and 2, or the shaft 188 may be connected with a control knob through the medium of a link construction in the same manner as shown in the other forms of the invention hereinbefore described. It is to be understood that the adjusting means or shaft in the other forms of the invention may likewise be formed with knurled portions 202 for accommodating control knobs.

In the operation of the arrangement shown in FIGURES 12 through 14, the operator or user adjusts the means or member 188 to the position at which it is desired to maintain the temperature of the cooking receptacle and its contents. The rotation of the means 188 causes corresponding rotation of the cam means 192 to effect deflection or distortion of the portion 176 of the member 170 and thereby change or modify the relative position of the second switch arm 54c and the contact 55c carried thereby.

The thermoresponsive component or element 50c is influenced by the ambient temperature and through the medium of the strut 78c influences the position of the first switch member or arm 52c whereby the circuit through the heating element is energized or deenergized through the engagement or disengagement of the contact 53c with the contact 55c.

FIGURES 15 through 17 illustrate a modified form of the invention of the general arrangement illustrated in FIGURE 3. The supporting plate 44d, the support shaft or pin 46d, the thermoresponsive means or bimetallic element 50d, the first switch arm 52d carrying the contact 53d and the second switch arm 54d carrying the contact 55d, and the struts 78d and 98d formed of ceramic or lava are of the same construction as the corresponding components illustrated in FIGURE 3 and function in a like manner as hereinbefore explained.

A support bracket 209 is provided with a planar portion 210 having an opening to accommodate the shaft 46d, the swaging 75d securing the bracket 210 in the stacked switch assembly.

The bracket 209 is provided with a depending portion 212. The planar portion 210 of the bracket is fashioned with depending ears 214 having openings accommodating a pivot pin or stub shaft 216. A motion translating means or member 218 is pivotally mounted by the rivet or stub shaft 216. The motion translating means or member 218 is fashioned with a generally U-shaped portion having parallel leg portions or walls 220 and 222 joined by a bight portion 224, as particularly shown in FIGURE 16.

The portions of the walls 220 and 222 adjacent the ears 214 are fashioned with openings accommodating the rivet 216 whereby the member or means 218 is pivotally supported upon the stub shaft or rivet 216. Integrally formed with and extending laterally from the wall 220 of the member 218 is a pad portion or flange 226 provided with a threaded bore accommodating the member 96d which is engaged with the strut 98d for transmitting movement of the member 218 to the second switch arm 54d.

The depending portion 212 of the support bracket carries the bushing 104d, the bushing being provided with a threaded bore accommodating the threaded portion of an adjusting means or member 108d. The extremity of the member 108d is fashioned with a semi-spherically shaped portion 109d which engages the bight portion 224 of the motion translating means or component 218.

Rotational movement of the member 108d effects longitudinal movement thereof and, through its engagement with the member 218, causes pivotal movement of the member about the axis of the rivet 216 and thereby control or regulate the position of the second switch arm 54d and the contact 55d carried thereby. The adjusting means 108d is provided with a pin 110d cooperable with an abutment 112d to limit the rotation of the adjusting means 108d.

The operation of the arrangement shown in FIGURES 15 and 17 is substantially the same as the operation of the construction shown in FIGURE 3. The user or operator adjusts the means 108d through a suitable control knob of the character shown at 120 in FIGURES 1 and 2, which movement is transmitted through the translating means or member 218 to the second switch member or arm 54d for determining the relative static position of the contact 55d.

An increase in the ambient temperature causes the thermoresponsive element 50d to be deflected downwardly as viewed in FIGURE 15 engaging the strut 78d to engage the switch arm 52d and separate the contact 53d from contact 55d to interrupt the circuit through the heating element 18, illustrated in FIGURES 2 and 3. Through this arrangement, the temperature of the cooking receptacle and its contents is controlled in the same manner as explained in connection with the form of the invention shown in FIGURE 3.

In all forms of the invention, the arrangement of adjusting means, being disposed in substantial parallelism with the switch arms, provides for a minimum depth of the assembly beneath a range burner or heater 18 and makes possible the positioning of the thermoresponsive or bimetallic element and the switch arms close to the cooking utensil or receptacle whereby the thermoresponsive component is influenced by minute temperature changes so as to effectively maintain substantially constant the temperature of the cooking receptacle and its contents. In all forms of the construction, the user or operator is enabled to readily adjust one of the switch arms to secure a temperature setting of the switch mechanism at which it is desired to maintain the cooking receptacle.

It is apparent that, within the scope of the invention, modifications and different arrangements may be made other than as herein disclosed, and the present disclosure is illustrative merely, the invention comprehending all variations thereof.

I claim:

1. Control apparatus for an electrically energizable surface heating unit for a cooking range wherein the heating unit is shaped to define an open area, in combination, a hollow housing having a planar portion in registration with the open area and a depending circular wall portion, resilient means normally supporting said housing with the planar portion thereof above the plane of the upper surface of the heating unit, a metal plate contiguous with and secured to the lower surface of the planar portion of the housing, a cylindrical member secured to the plate and depending therefrom, switch means mounted by said cylindrical member including first and second switch arms in generally parallel relation to each other and to the planar portion of the housing, cooperating contacts carried by the switch arms, terminal connectors engaging said switch arms and arranged to be connected in an energizing circuit for the heating unit, an elongated thermoresponsive element mounted adjacent said plate and generally parallel with the plate arranged to be influenced by heat from the heating unit, a supplemental electrically energizable heating means in circuit with one of said switch arms whereby the heat from said supplemental heating means influences the thermoresponsive element, bracket means carried by said cylindrical member, manually actuable means carried by said bracket means and movable along an axis in substantial parallelism with the switch arms, and a motion translating member pivotally supported on said bracket means and engaged by said manually actuable means for transferring relative movement of said manually actuable means to said second switch arm for adjusting the relative position of the second switch arm, said thermoresponsive element being arranged to control the position of said first switch arm.

2. Control apparatus for an electrically energizable surface heating unit for a cooking range wherein the heating unit is shaped to define an open area, in combination, a housing having a planar portion in registration with the open area and a depending circular wall portion, resilient means normally supporting said housing with the planar portion thereof above the plane of the upper surface of the heating unit, a plate contiguous with and secured to the lower surface of the planar portion of the housing, switch means mounted by the plate and embraced within the circular wall of said housing, said switch means including first and second switch arms in generally parallel relation with the planar portion of the housing, cooperating contacts carried by said switch arms, terminals for the switch arms arranged to be connected in an energizing circuit for the heating unit, a thermoresponsive element arranged adjacent to and generally parallel with said plate to be influenced by heat generated by said heating unit for controlling the relative position of said first switch arm, a supplemental electrically energizable heating means disposed adjacent the thermoresponsive element, said supplemental heating means being in circuit with one of the switch arms and adapted to be energized when the contacts carried by the switch arms are in circuit closing position whereby heat from the supplemental heating means influences the thermoresponsive element, a bracket mounted by the plate, manually rotatable means threadedly supported by said bracket rotatable about an axis lying in a plane substantially parallel with the plane of the planar portion of said housing, and a relatively movable motion translating member carried by the bracket for transferring movement of said rotatable means to said second switch arm for regulating the relative position of said second switch arm.

References Cited by the Examiner

UNITED STATES PATENTS

| | | | |
|---|---|---|---|
| 2,267,387 | 12/1941 | Winborne | 200—139 |
| 2,795,673 | 6/1957 | Schwaneke | 200—138 |
| 2,854,548 | 9/1958 | Cassidy | 200—138 X |
| 2,888,548 | 5/1959 | Knapp | 219—37 X |
| 3,051,808 | 8/1962 | Reffel | 200—138 |

BERNARD A. GILHEANY, *Primary Examiner.*